(12) United States Patent
Ignatuk et al.

(10) Patent No.: US 9,912,542 B2
(45) Date of Patent: Mar. 6, 2018

(54) METHODS AND SYSTEMS FOR MANAGING PORT REACHABILITY IN A CLUSTERED SYSTEM

(71) Applicant: NETAPP, INC., Sunnyvale, CA (US)

(72) Inventors: James Andrew Ignatuk, Mars, PA (US); Jeffrey David Prem, Pittsburgh, PA (US); Brian Richard Panasko, McMurray, PA (US)

(73) Assignee: NETAPP, INC., Sunnyvale, CA (US)

(*) Notice: Subject to any disclaimer, the term of this patent is extended or adjusted under 35 U.S.C. 154(b) by 226 days.

(21) Appl. No.: 14/489,065

(22) Filed: Sep. 17, 2014

(65) Prior Publication Data

US 2016/0080209 A1   Mar. 17, 2016

(51) Int. Cl.
| | |
|---|---|
| G06F 15/16 | (2006.01) |
| G06F 15/173 | (2006.01) |
| H04L 12/24 | (2006.01) |
| H04L 29/08 | (2006.01) |
| H04L 12/26 | (2006.01) |

(52) U.S. Cl.
CPC .......... *H04L 41/12* (2013.01); *H04L 43/0817* (2013.01); *H04L 67/1097* (2013.01)

(58) Field of Classification Search
CPC ......... H04L 63/10; H04L 67/02; H04L 67/10; H04L 67/16; H04L 67/125; H04L 67/141; H04L 67/1097; H04L 12/28; H04L 12/56; H04L 12/66; H04L 12/189; H04L 61/2015; H04L 61/6068

USPC .......................................... 709/217, 226, 228
See application file for complete search history.

(56) References Cited

U.S. PATENT DOCUMENTS

| | | | | |
|---|---|---|---|---|
| 6,856,621 B1 * | 2/2005 | Artes | ................... | H04L 12/185 370/390 |
| 7,844,690 B1 * | 11/2010 | Durham | ............. | H04L 12/4625 709/220 |
| 8,125,991 B1 * | 2/2012 | Schlansker | ......... | H04L 45/7457 370/392 |
| 9,036,636 B1 * | 5/2015 | Sherwood | ............... | H04L 45/04 370/392 |
| 2005/0021751 A1 * | 1/2005 | Block | ...................... | G06F 9/54 709/225 |
| 2007/0168581 A1 * | 7/2007 | Klein | ..................... | G06F 11/201 710/31 |
| 2014/0025736 A1 * | 1/2014 | Wang | ...................... | H04L 45/46 709/204 |
| 2014/0185611 A1 * | 7/2014 | Lie | .......................... | H04L 49/25 370/355 |

* cited by examiner

*Primary Examiner* — Farzana Huq
(74) *Attorney, Agent, or Firm* — Klein, O'Neill & Singh, LLP

(57) ABSTRACT

Methods and systems for port reachability are provided. The process obtains an identifier for ports of a broadcast domain to access storage space at a clustered storage system; sends a discovery request to the ports of the broadcast domain; receives a response to the discovery request from some or all the ports; places ports that responded to the discovery request to a first group that indicates that all ports within the group are reachable; and reports ports within the first group to a user to indicate which ports within the broadcast domain are reachable.

18 Claims, 7 Drawing Sheets

METHODS AND SYSTEMS FOR MANAGING PORT REACHABILITY IN A CLUSTERED SYSTEM

TECHNICAL FIELD

The present disclosure relates to communication in networked storage systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems may include a plurality of nodes operating within a cluster for processing client requests. The nodes may have a plurality of ports that are used for communication with the cluster and outside the cluster. Clients may use more than one port within a broadcast domain to communicate within the cluster and may need to know what ports are reachable at any given time. Continuous efforts are being made for efficiently managing port reachability and reporting it to clients.

SUMMARY

In one aspect, a machine implemented method is provided. The method includes obtaining an identifier for ports of a broadcast domain to access storage space at a clustered storage system; sending a discovery request to the ports of the broadcast domain; receiving a response to the discovery request from some or all the ports; placing any port that responded to the discovery request to a first group that indicates that all ports within the group are reachable; and reporting any port within the first group to a user to indicate that the first group port is reachable.

In another aspect, a non-transitory, machine readable storage medium having stored thereon instructions for performing a method is provided. The machine executable code which when executed by at least one machine, causes the machine to: obtain an identifier for ports of a broadcast domain to access storage space at a clustered storage system; send a discovery request to the ports of the broadcast domain; receive a response to the discovery request from some or all the ports; place any port that responded to the discovery request to a first group that indicates that all ports within the group are reachable; and report any port within the first group to a user to indicate that the first group port is reachable.

In yet another aspect, a system having a memory containing machine readable medium comprising machine executable code having stored thereon instructions is provided. A processor module coupled to the memory is configured to execute the machine executable code to: obtain an identifier for ports of a broadcast domain to access storage space at a clustered storage system; send a discovery request to the ports of the broadcast domain; receive a response to the discovery request from some or all the ports; place any port that responded to the discovery request to a first group that indicates that all ports within the group are reachable; and report any port within the first group to a user to indicate that the first group port is reachable.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Methods and systems for port reachability are provided. In one aspect, an identifier for ports of a broadcast domain used for accessing a clustered storage system are obtained. A discovery request is to the ports of the broadcast domain. Based on the response to the discovery request from some or all the ports, ports that responded to the discovery request are placed in a first group that indicates that all ports within the group are reachable. The reachability status is then reported to a client system.

Figure 1A:
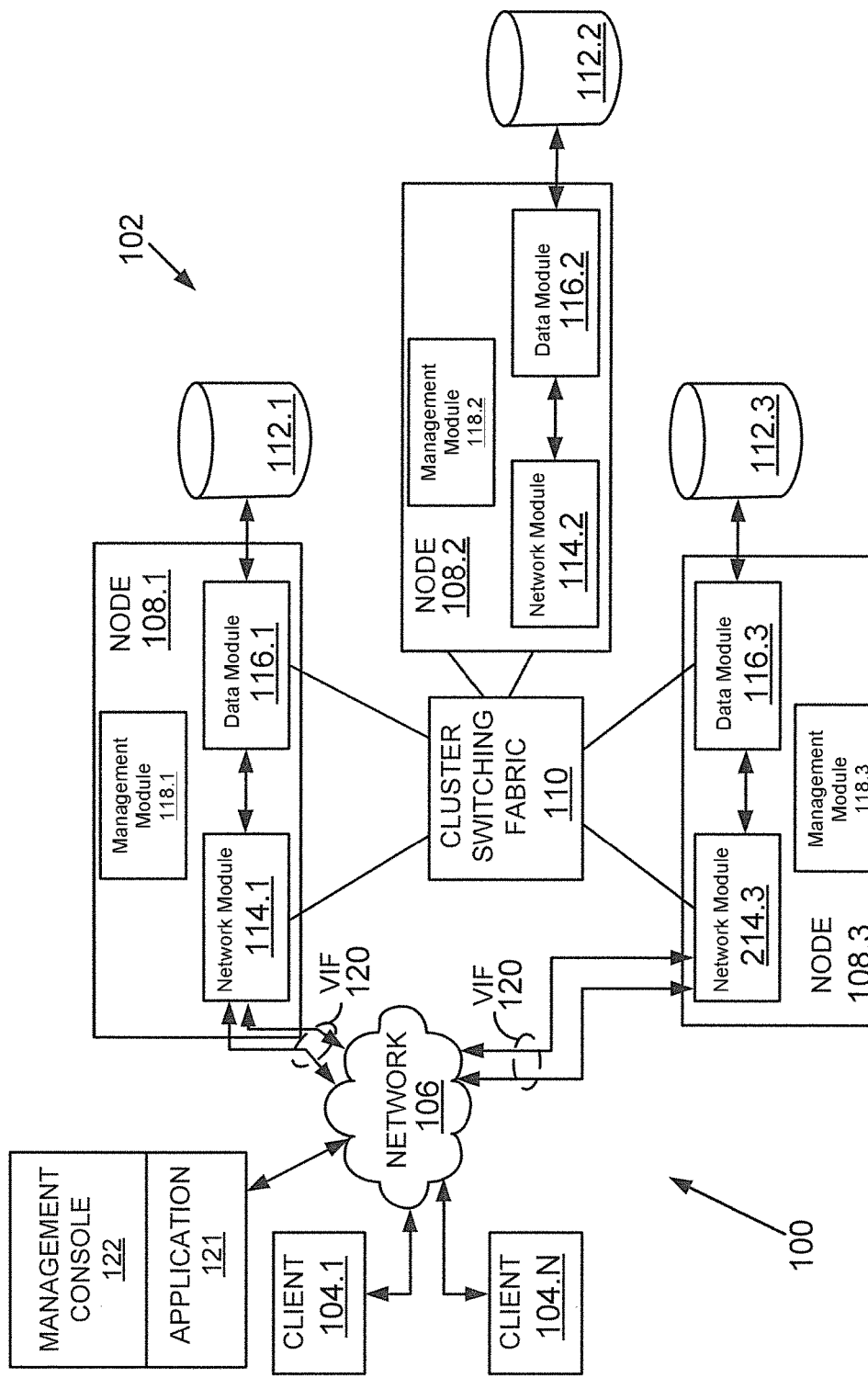
FIGS. 1A-1B show examples of operating environments for the various aspects disclosed herein.

Clustered System:

FIG. 1A shows a cluster based storage environment 100 having a plurality of nodes 108.1-108.3 where the various aspects disclosed herein can be implemented. Storage environment 100 may include a plurality of client computing systems (also referred to as a client system or client) 104.1-104.N, a clustered storage system 102 and at least a network 106 communicably connecting the client systems 104.1-104.N and the clustered storage system 102. As described below in detail a client system may use various ports within a broadcast domain to access one or more nodes of the clustered storage system 102. The various aspects described below provide port reachability status to clients such that the client systems do not have to perform tedious discovery to determine which ports of the broadcast domain are reachable, at any given time.

The clustered storage systems include the plurality of nodes 108.1-108.3 used for executing a plurality of modules as described below, a cluster switching fabric 110, and a plurality of mass storage devices 112.1-112.3 (may be also be referred to as 112). The mass storage devices 112 may include writable storage device media such as magnetic disks, video tape, optical, DVD, magnetic tape, non-volatile memory devices for example, self-encrypting drives, flash memory devices and any other similar media adapted to store information. The storage devices 112 may be organized as one or more groups of Redundant Array of Independent (or Inexpensive) Disks (RAID). The aspects disclosed are not limited to any particular storage device or storage device configuration.

The storage system 102 provides a set of storage volumes to clients for storing information at storage devices 112. A storage operating system executed by the nodes of storage system 102 present or export data stored at storage devices 112 as a volume, or one or more qtree sub-volume units. Each volume may be configured to store data files (or data containers or data objects), scripts, word processing documents, executable programs, and any other type of structured or unstructured data. From the perspective of client systems, each volume can appear to be a single storage drive. However, each volume can represent the storage space in at one storage device, an aggregate of some or all of the storage space in multiple storage devices, a RAID group, or any other suitable set of storage space.

The storage system 102 may be used to store and manage information at storage devices 112 based on a client request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

Each of the plurality of nodes 108.1-108.3 is configured to include an N-module, a D-module, and an M-Module, each of which can be implemented as a processor executable module. For example, node 108.1 includes N-module 114.1, D-module 116.1, and M-Module 118.1, node 108.2 includes N-module 114.2, D-module 116.2, and M-Module 118.2, and node 108.3 includes N-module 114.3, D-module 116.3, and M-Module 118.3.

The N-modules 114.1-114.3 include functionality that enable the respective nodes 108.1-108.3 to connect to one or more of the client systems 104.1-104.N over network 106 and with other nodes via switching fabric 110. The D-modules 116.1-116.3 connect to one or more of the storage devices 112.1-112.3. The M-Modules 118.1-118.3 provide management functions for the clustered storage system 102.

A switched virtualization layer including a plurality of virtual interfaces (VIFs) 120 is provided to interface between the respective N-modules 114.1-114.3 and the client systems 104.1-104.N, allowing storage 112.1-112.3 associated with the nodes 108.1-108.3 to be presented to the client systems 104.1-104.N as a single shared storage pool.

In one aspect, the clustered storage system 102 can be organized into any suitable number of virtual servers (may also be referred to as "Vservers" or virtual storage machines). A Vserver is a virtual representation of a physical storage controller/system and is presented to a client system for storing information at storage devices 112. Each Vserver represents a single storage system namespace with independent network access. Each Vserver has a user domain and a security domain that are separate from the user and security domains of other Vservers. Moreover, each Vserver is associated with one or more VIFs 120 and can span one or more physical nodes, each of which can hold one or more VIFs 120 and storage associated with one or more Vservers. Client systems can access the data on a Vserver from any node of the clustered system through the VIFs associated with that Vserver.

Each of the nodes 108.1-108.3 is defined as a computing system to provide application services to one or more of the client systems 104.1-104.N. The nodes 108.1-108.3 are interconnected by the switching fabric 110, which, for example, may be embodied as a switch or any other type of connecting device.

Although FIG. 1A depicts an equal number (i.e., 3) of the N-modules 114.1-114.3, the D-modules 116.1-116.3, and the M-Modules 118.1-118.3, any other suitable number of N-modules, D-modules, and M-Modules may be provided. There may also be different numbers of N-modules, D-modules, and/or M-Modules within the clustered storage system 102. For example, in alternative aspects, the clustered storage system 102 may include a plurality of N-modules and a plurality of D-modules interconnected in a configuration that does not reflect a one-to-one correspondence between the N-modules and D-modules.

Each client system may request the services of one of the respective nodes 108.1, 108.2, 108.3, and that node may return the results of the services requested by the client system by exchanging packets over the computer network 106, which may be wire-based, optical fiber, wireless, or any other suitable combination thereof. The client systems may issue packets according to file-based access protocols, such as the NFS or CIFS protocol, when accessing information in the form of files and directories.

System 100 also includes a management console 122 executing a management application 121 out of a memory. Management console 122 may be used to configure and manage various elements of system 100. Management console 122 may be used to configure Vservers and network access addresses used by the network interface cards (NICs) of the cluster nodes.

Figure 1B:
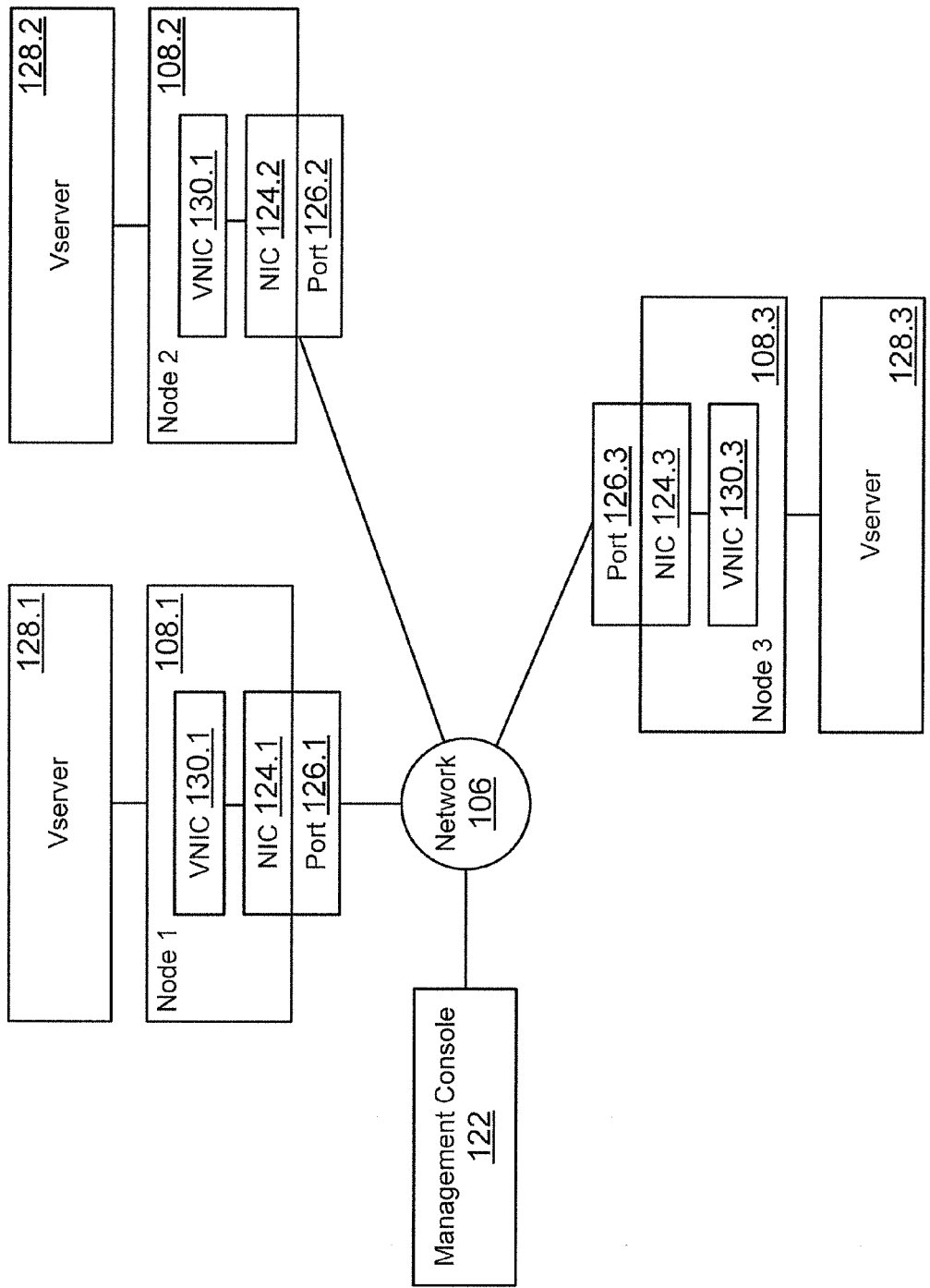

FIG. 1B shows an example of using network NICs by one or more Vservers 128.1-128.3 presented to client systems.

Each node has at least one NIC 124.1-124.3 with at least one physical port 126.1-126.3 that provide client connectivity to the various cluster nodes. Cluster nodes communicate with each other via a cluster adapter and fabric 110 (FIG. 1A). It is noteworthy that N-Module and D-modules of each node may have more than one cluster adapter for inter cluster and intra cluster communication.

Ports 126.1-126.3 of each NIC include logic and circuitry to send and receive packets. The structure of the logic and circuitry is such that it allows the NICs to handle packets complying with one or more protocols, for example, Ethernet, Fibre Channel and others.

NICs 124.1-124.3 include a processing device, a receiving and transmitting segments that are used to process incoming and outgoing packets. Details regarding the structure of NICs 124.1-124.3 are not germane to the various aspects described herein and hence are not described.

Each Vserver 128.1-128.3 may be presented with a virtual NIC (VNIC) 130.1-130.3 for sending and receiving packets. Each VNIC is a virtual representation of the physical NIC and this allows multiple Vservers to share a same physical NIC.

More than one port is used for communication within the clustered storage and outside the clustered storage system. It is undesirable for users of the clustered storage system to perform diagnostics to determine whether a port within a broadcast domain (defined below) is reachable. The various aspects described herein provide systems and methods that allow the storage system nodes to determine port reachability and then provide that information to clients.

Figure 2A:
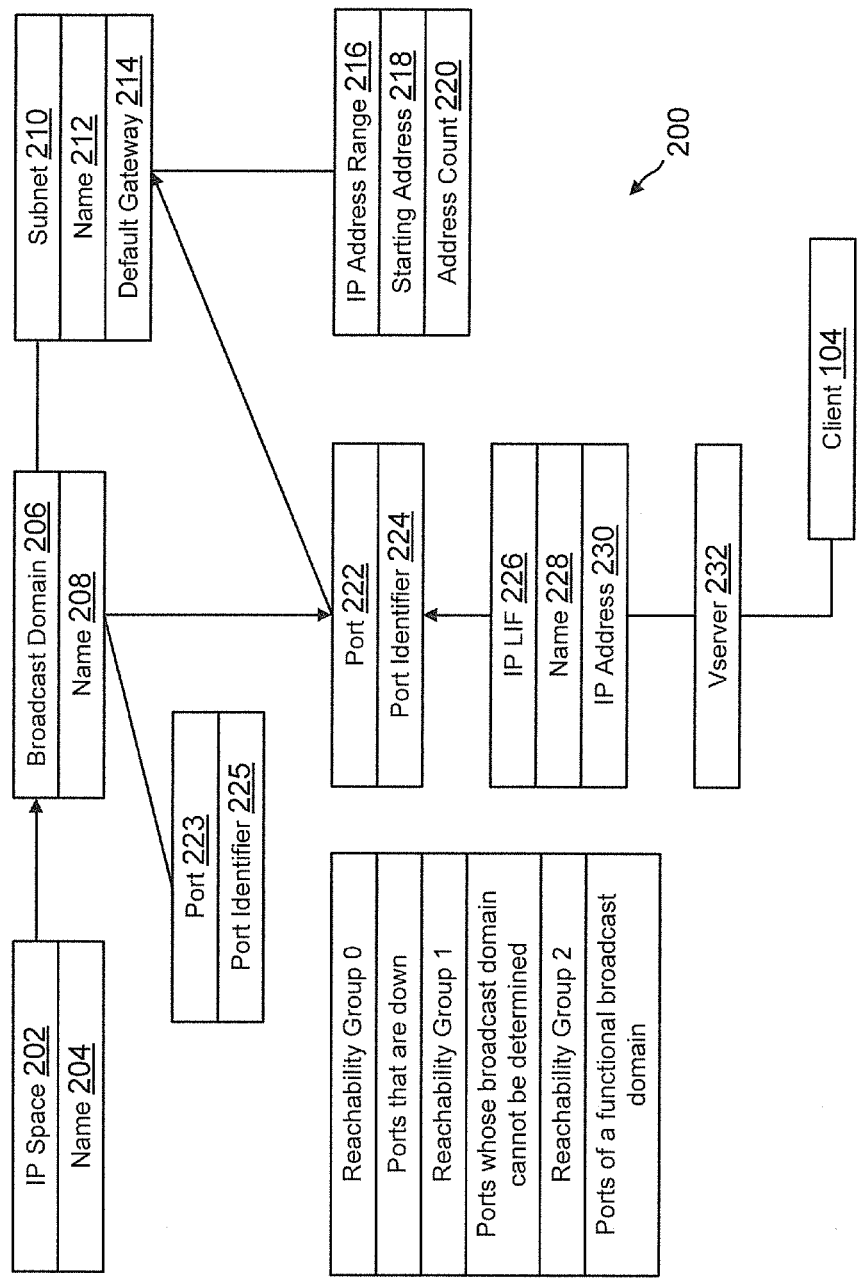
FIG. 2A shows an example of a layout for network addressing used by the various aspects of the present disclosure for providing client access to a clustered storage system.

FIG. 2A shows an example of a layout 200 that is used by the clustered storage system for managing network addressing, according to one aspect. Layout 200 includes an Internet Protocol (IP) address space 202 which is identified by a unique name or identifier 204. The IP address space 202 is an object that includes a plurality of unique IP addresses.

Most networks today use the TCP/IP protocol for communication. In the TCP/IP protocol, an IP address is used to uniquely identify a computing device. As an example, there are two standards for IP addresses: IP Version 4 (IPv4) and IP Version 6 (IPv6). IPv4 uses 32 binary bits to create a single unique address on the network. An IPv4 address is expressed by four numbers separated by dots. Each number is the decimal (base-10) representation for an eight-digit binary (base-2) number, also called an octet, for example: 216.27.61.137.

IPv6 uses 128 binary bits to create a single unique address on the network. An IPv6 address is expressed by eight groups of hexadecimal (base-16) numbers separated by colons.

An IP address can be either dynamic or static. A static address is one that a user can configure. Dynamic addresses are assigned using a Dynamic Host Configuration Protocol (DHCP), a service running on a network. DHCP typically runs on network hardware such as routers or dedicated DHCP servers.

IP address space 202 owns at least one broadcast domain 206 that is identified by a unique identifier 208. The broadcast domain 206 allows a user to send information to more than one destination using a single message or packet. The broadcast domain 206 includes more than one port 222/223 identified by a unique port identifier 224/225, respectively. It is noteworthy that ports can be added or removed from the broadcast domain.

The broadcast domain 206 is associated with a subnet 210 identified by a unique identifier 212 with a default gateway 214. Subnet 210 is a logical, visible portion of an IP network. All network devices of a subnet are addressed with a common, identical, most-significant bit-group in their IP address. This results in the logical division of an IP address into two fields, a network or routing prefix and a host identifier that identifies a network interface. The subnet 210 has an IP address range 216 with a starting addressing and an address count 220. A gateway address 214 is also assigned to the subnet 210. The gateway address 214 is used by a computing device within the subnet 210 for routing information.

Layout 200 includes a logical interface (LIF) 226 that is identified by a unique identifier 228 and uses at least one port 222. LIF 226 includes an external IP address 230 by which clients connect to the clustered storage system. The IP address 230 may be static or dynamic.

Each Vserver 232 (similar to 128.1-128.3) is associated with a LIF 226. The Vserver 232 is presented to the client 104 that uses the LIF 226 to communicate with the clustered storage system.

In one aspect, a broadcast domain may have a plurality of ports. The broadcast domain is presented to the client 104 but the client is not aware of what ports are reachable at any given time. Layout 200 maintains a plurality of reachability groups that are used to provide port status to clients. For example, a first reachability Group 0 includes all ports that are down or taken offline at any given time. Group 1 includes ports whose status cannot be determined. Group 2 includes all the reachable ports within the broadcast domain 206. The group information may be stored at a memory device by each M-module 118.1-118.3. The group information is provided to client 104 so that the client does not have to perform any diagnostics.

Figure 2B:
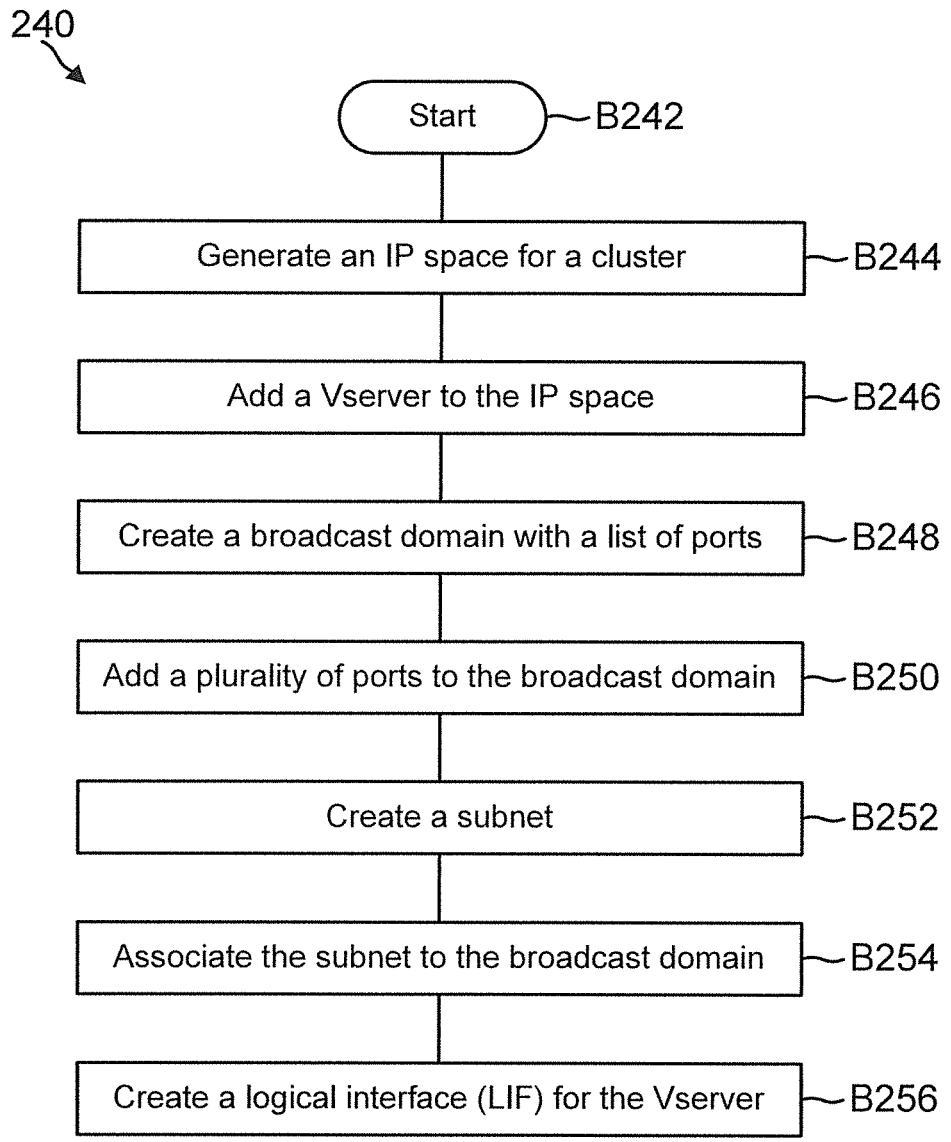
FIGS. 2B-2C show various process flow diagrams, according to the various aspects of the present disclosure.

FIG. 2B shows a process 240 for using the addressing layout 200 of FIG. 2A. The process begins in block B242, when management console 122 is operational and management application 121 is initialized. As an example, the various process blocks of FIG. 2A are executed by management application 121 or any other entity. The IP space 202 for a cluster 102 is generated in block B244.

In block B246, a vserver (for example, 232) is added to the IP space. In block B248, the broadcast domain 206 with a list of ports is generated.

In block B250, a plurality of ports 222/223 are added to the broadcast domain. Thereafter, the subnet 210 is created in block B252 and associated with the broadcast domain 206 in block B254. In block B256, LIF 226 for the Vserver is created in block B256. The client is now ready to use the cluster via the LIF 226 created in block B256.

In one aspect, the information regarding IP space 202, broadcast domain 206, LIF 226 and the associated Vservers is maintained as a relational data structure. The data structure is stored at a memory device of M-modules 118.1-118.3.

Figure 2C:
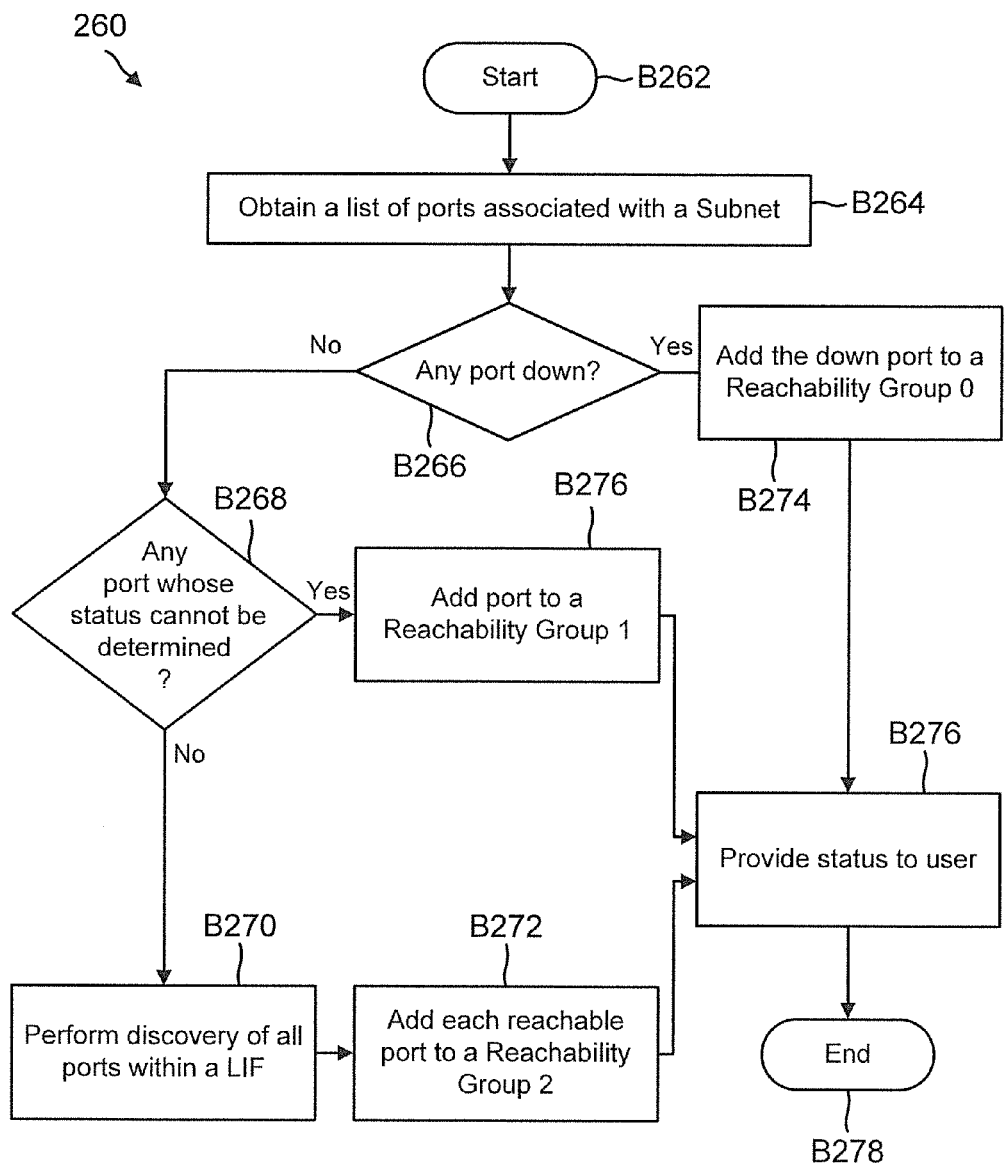

FIG. 2C shows a process 260 for providing reachability status, according to one embodiment. As an example, process 260 is executed by M-modules 118.1-118.3. The process begins in block B262, after a broadcast domain 206 has been created. In block B264, the process obtains a list of ports (for e.g. 222/223) for the subnet associated with the broadcast domain. A data structure maintained by the M-modules 118.1-118.3 stores this information.

The process first determines in block B266, if there are any ports that are down or unavailable. The N-modules 114.1-118.3 maintain information regarding all ports that are down, at any given time. This information is obtained by the M-module 118.1-118.3.

If no ports are down or unavailable, then in block B268, the process determines if there are any ports whose status cannot be determined. The N-modules 114.1-118.3 also maintain information regarding ports whose status cannot be determined, at any given time. This information is also obtained by the M-module 118.1-118.3.

If there are no ports whose status cannot be determined, then in block B270, a discovery request is sent to the ports within the broadcast domain. The discovery request may be initiated by an M-module or an N-module. The ports that respond to the discovery request are added to reachability Group 2 in block B272. The discovery request may use the Address Resolution Protocol used to query a network address in a subnet. The process then moves to block B276 described below.

If there were ports that were unavailable in block B266, then in block B274, the ports are moved to reachability Group 0. If there are ports whose status cannot be determined in block B268, then in block B276, the ports are added to Group 1.

In block B276, the client is provided with a status on Group 0, Group 1 and Group 2 ports. The port status may be presented by M-modules 118.1-118.3 via a graphical user interface, a command line interface or any other electronic means. The status allows the client system to take proactive action and/or re-configure ports within a broadcast domain. The process then ends in block B278.

In one aspect, a client does not have to be concerned about port reachability. The clustered nodes ascertain port status and reachability and provide that information to the client systems.

Figure 3:
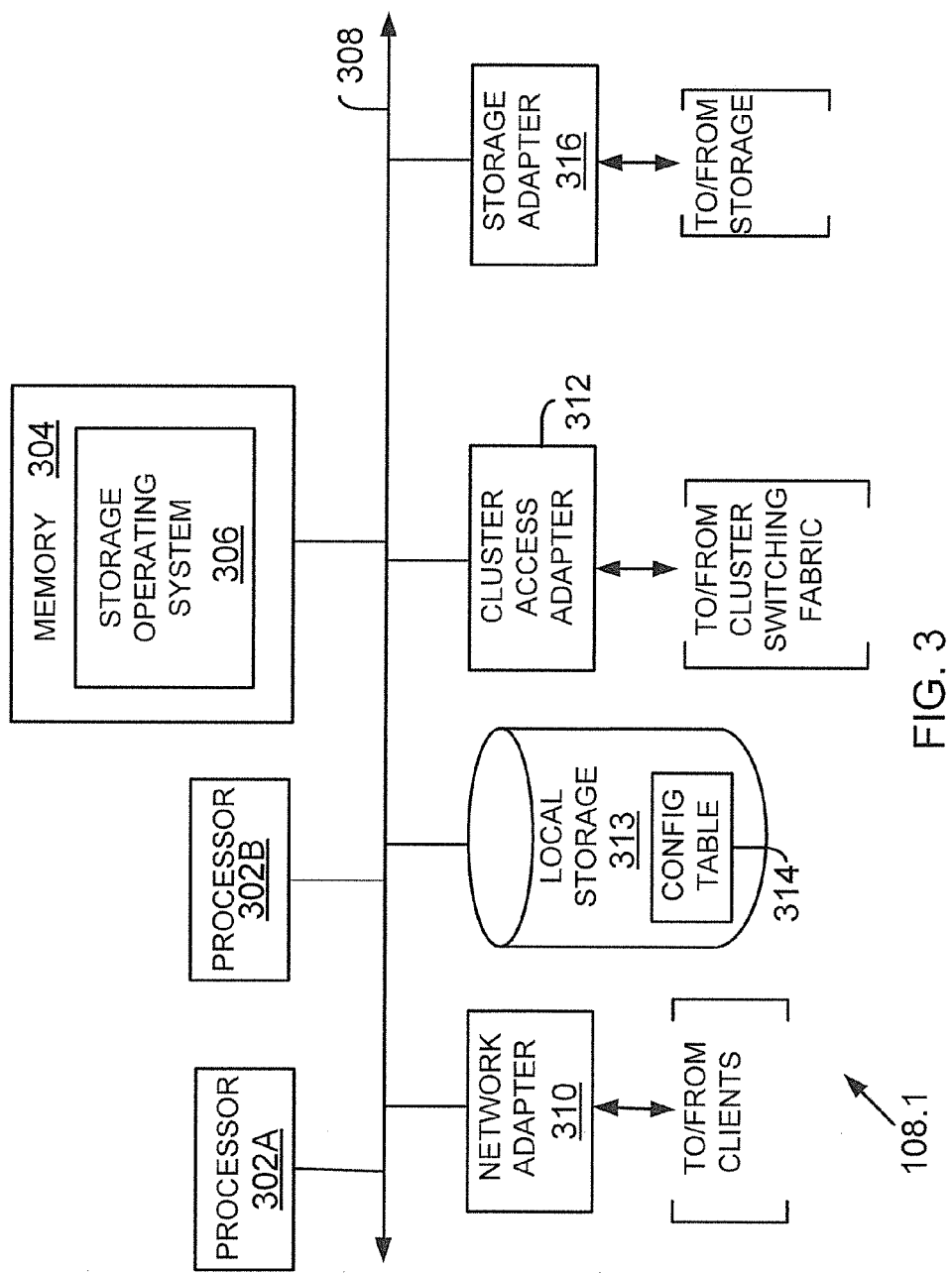
FIG. 3 is an example of a storage node used in the cluster of FIG. 1A, according to one aspect of the present disclosure.

Storage System Node:

FIG. 3 is a block diagram of node 108.1 that is illustratively embodied as a storage system comprising of a plurality of processors 302A and 302B, a memory 304, a network adapter 310, a cluster access adapter 312, a storage adapter 316 and local storage 313 interconnected by a system bus 308. The network adapter 310 includes ports whose reachability is determined by using the process blocks of FIG. 2C.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314.

The cluster access adapter 312 comprises a plurality of ports adapted to couple node 108.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 100/101.

Node 108.1 is illustratively embodied as a dual processor storage system executing a storage operating system 306 that preferably implements a high-level module, such as a file system, to logically organize the information as a hierarchical structure of named directories and files on storage 112. However, it will be apparent to those of ordinary skill in the art that the node 108.1 may alternatively comprise a single or more than two processor systems. Illustratively, one processor 302A executes the functions of the N-module 114, M-module 118, while the other processor 302B executes the functions of the D-module 116. In another aspect, one processor executes the functions of M-module 118, while the other processor executes the functions of both D-module 116 and N-module 114. In yet another aspect, a dedicated processor (not shown) may be used to execute the functions of M-module 118.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the presented disclosure.

The storage operating system 306 portions of which is typically resident in memory and executed by the processing elements, functionally organizes the node 108.1 by, inter alia, invoking storage operation in support of the storage service implemented by the node.

The network adapter 310 comprises a plurality of ports adapted to couple the node 108.1 to one or more clients over point-to-point links, wide area networks, virtual private networks implemented over a public network (Internet) or a shared local area network. The network adapter 310 thus may comprise the mechanical, electrical and signaling circuitry needed to connect the node to the network.

The storage adapter 316 cooperates with the storage operating system 306 executing on the node 108.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 112. The storage adapter 316 comprises a plurality of ports having input/output (I/O) interface circuitry that couples to the storage devices over an I/O interconnect arrangement, such as a conventional high-performance, FC link topology.

Figure 4:
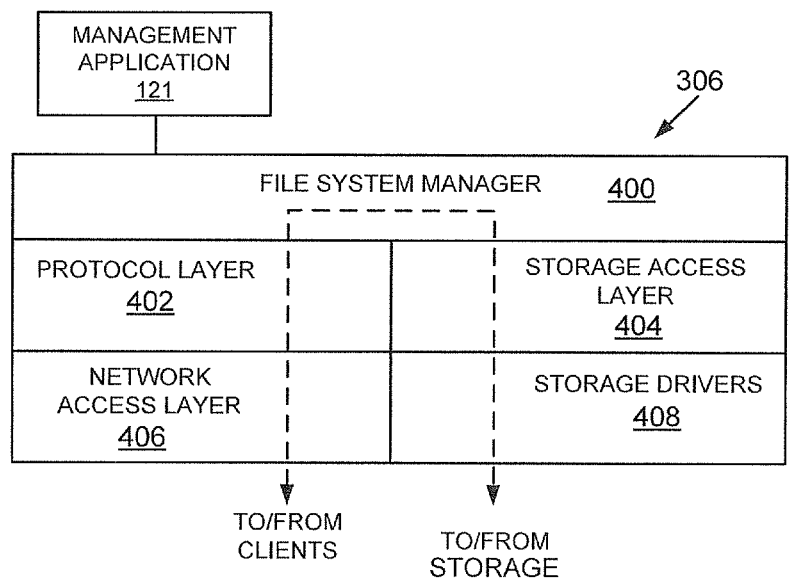
FIG. 4 shows an example of a storage operating system, used according to one aspect of the present disclosure.

Operating System:

FIG. 4 illustrates a generic example of storage operating system 306 executed by node 108.1, according to one aspect of the present disclosure. The storage operating system 306 interfaces with the management application 121 for configuring the IP space 202, broadcast domain 206, LIF 226 and Vserver 232 described above with respect to FIG. 2A.

In one example, storage operating system 306 may include several modules, or "layers" executed by one or both of N-Module 114 and D-Module 116. These layers include a file system manager 400 that keeps track of a directory structure (hierarchy) of the data stored in storage devices and manages read/write operation, i.e. executes read/write operation on storage in response to client requests.

Storage operating system 306 may also include a protocol layer 402 and an associated network access layer 406, to allow node 108.1 to communicate over a network with other systems. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients' and mass storage devices 112 are illustrated schematically as a path, which illustrates the flow of data through storage operating system 306.

The storage operating system 306 may also include a storage access layer 404 and an associated storage driver layer 408 to allow D-module 116 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information LUN, storage volume, aggregate and various storage devices.

As used herein, the term "storage operating system" generally refers to the computer-executable code operable on a computer to perform a storage function that manages data access and may, in the case of a node 108.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
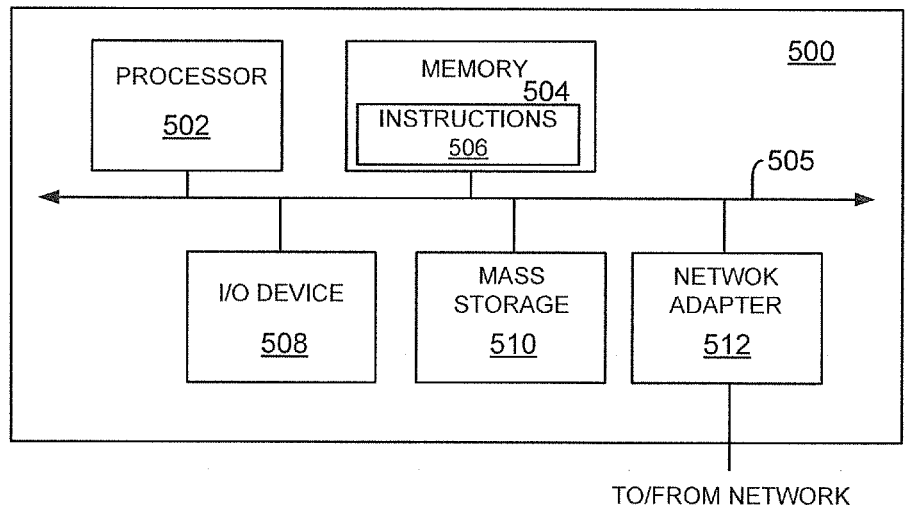
FIG. 5 shows an example of a processing system, used according to one aspect of the present disclosure.

Processing System:

FIG. 5 is a high-level block diagram showing an example of the architecture of a processing system 500 that may be used according to one aspect. The processing system 500 can represent the management console 122, a M-module 118, or client 104. Note that certain standard and well-known components which are not germane to the present disclosure are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps described above with respect to FIGS. 2B-2C may reside in and executed (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing:

The system and techniques described above are applicable and useful in the upcoming cloud computing environment where computing is provided as a service. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term cloud refers to a network (for example, the Internet or any other network) used for providing computing as a service.

Typical cloud computing providers deliver common business applications online (for example, via the Internet or any other network type) which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services.

Thus, methods and systems for managing and reporting port reachability have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method for providing a reachability status, comprising:
   creating a broadcast domain and associating ports to the broadcast domain to access one or more nodes at a clustered storage system;
   determining an identifier for the ports associated with the broadcast domain to determine whether the ports are available, wherein determining whether the ports associated with the broadcast domain are available comprises sending a discovery request to the ports of the broadcast domain;
   receiving an availability response to the discovery request from at least one of the ports;
   placing the identifier for the at least one of the ports that responded to the discovery request in a first group for ports that are reachable; and
   reporting the at least one of the ports within the first group to a user to indicate that the first group port is reachable,
   wherein the discovery request complies with an address resolution protocol that is used to query the ports in a subnet,
   wherein the user assigns network access addresses for the broadcast domain and a clustered storage system node determines port reachability for the ports.

2. The method of claim 1, further comprising:
   identifying at least one of ports that is unreachable; and
   placing the at least one of the unreachable port in a second group.

3. The method of claim 2, further comprising;
   reporting the second group port to the user.

4. The method of claim 1, further comprising:
   identifying at least one of ports whose status cannot be determined; and
   placing the at least one of the port whose status cannot be determined in a third group.

5. The method of claim 4, further comprising:
   reporting the third group port to the user.

6. The method of claim 1, wherein the identifier comprises at least one of the following: available, unreachable, and unavailable to determine status.

7. A non-transitory, machine readable storage medium having stored thereon instructions for performing a method, comprising machine executable code which when executed by at least one machine, causes the machine to:
   create a broadcast domain and associating ports to the broadcast domain to access one or more nodes at a clustered storage system;
   determine an identifier for the ports associated with the broadcast domain to determine whether the ports are available, wherein determining whether the ports associated with the broadcast domain are available comprises sending a discovery request to the ports of the broadcast domain;
   receive an availability response to the discovery request from at least one of the ports;
   place the identifier for the at least one of the ports that responded to the discovery request in a first group for ports that are reachable; and
   report the at least one of the ports within the first group to a user to indicate that the first group port is reachable,
   wherein the discovery request complies with an address resolution protocol that is used to query the ports in a subnet, and
   wherein the user assign network access addresses for the broadcast domain and a clustered storage system node determines port reachability for the ports.

8. The storage medium of claim 7, further causes the machine to identify at least one of ports that is unreachable and place the at least one of the unreachable port in a second group.

9. The storage medium of claim 8, further causes the machine to report the second group port to the user.

10. The storage medium of claim 7, further causes the machine to identify at least one of ports whose status cannot be determined and place the at least one of the port whose status cannot be determined in a third group.

11. The storage medium of claim 10, further causes the machine to report the third group port to the user.

12. The storage medium of claim 7, wherein the identifier comprises at least one of the following: available, unreachable, and unavailable to determine status.

13. A system comprising: a memory containing machine readable medium comprising machine executable code having stored thereon instructions; and
   a processor module coupled to the memory, the processor module configured to execute the machine executable code to:
      create a broadcast domain and associating ports to the broadcast domain to access one or more nodes at a clustered storage system;
      determine an identifier for the ports associated with the broadcast domain to determine whether the ports are available, wherein determining whether the ports associated with the broadcast domain are available comprises sending a discovery request to the ports of the broadcast domain;
      receive an availability response to the discovery request from at least one of the ports;
      place the identifier for the at least one of the ports that responded to the discovery request in a first group for ports that are reachable; and
      report the at least one of the ports within the first group to a user to indicate that the first group port is reachable,
      wherein the discovery request complies with an address resolution protocol that is used to query the ports in a subnet, and
      wherein the user assign network access addresses for the broadcast domain and a clustered storage system node determines port reachability for the ports.

14. The system of claim 13, further causes the machine to identify at least one of ports that is unreachable and place the at least one of the unreachable port in a second group.

15. The system of claim 14, further causes the machine to report the second group port to the user.

16. The system of claim 13, further causes the machine to identify at least one of ports whose status cannot be determined and place the at least one of the port whose status cannot be determined in a third group.

17. The system of claim 16, further causes the machine to report the third group port to the user.

18. The system of claim 13, wherein the identifier comprises at least one of the following: available, unreachable, and unavailable to determine status.

\* \* \* \* \*